(12) United States Patent
Gam et al.

(10) Patent No.: US 10,386,672 B2
(45) Date of Patent: Aug. 20, 2019

(54) LIQUID CRYSTAL DISPLAY

(71) Applicant: SAMSUNG ELECTRONICS CO., LTD., Suwon-si, Gyeonggi-do (KR)

(72) Inventors: Sangah Gam, Seoul (KR); Beom Seok Kim, Seoul (KR); Hye Young Kong, Uijeongbu-si (KR); Hyunseok Choi, Anyang-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 57 days.

(21) Appl. No.: 15/839,163

(22) Filed: Dec. 12, 2017

(65) Prior Publication Data

US 2018/0164636 A1    Jun. 14, 2018

(30) Foreign Application Priority Data

Dec. 14, 2016    (KR) .......................... 10-2016-0170296

(51) Int. Cl.

| | |
|---|---|
| *G02B 6/02* | (2006.01) |
| *G02F 1/1335* | (2006.01) |
| *G02F 1/1343* | (2006.01) |
| *G02F 1/13363* | (2006.01) |

(52) U.S. Cl.
CPC ......... *G02F 1/133528* (2013.01); *G02B 6/02* (2013.01); *G02F 1/1343* (2013.01); *G02F 1/133514* (2013.01); *G02F 1/133617* (2013.01); *G02F 1/133634* (2013.01); *G02F 2001/133637* (2013.01); *G02F 2413/02* (2013.01)

(58) Field of Classification Search
CPC ......... G02F 1/133514; G02F 1/133617; G02F 1/1343; G02F 2001/133637; G02F 2413/02; G02F 2001/133565; G02B 6/02
See application file for complete search history.

(56) References Cited

U.S. PATENT DOCUMENTS

| | | |
|---|---|---|
| 8,796,704 B2 | 8/2014 | Hatta et al. |
| 2015/0331278 A1 | 11/2015 | Araki et al. |
| 2017/0269419 A1* | 9/2017 | Yang .................. G02F 1/13363 |

FOREIGN PATENT DOCUMENTS

| | | |
|---|---|---|
| JP | 2011075817 A | 4/2011 |
| KR | 1065181 B1 | 9/2011 |
| KR | 1450687 B1 | 10/2014 |

* cited by examiner

*Primary Examiner* — Nathanael R Briggs
(74) *Attorney, Agent, or Firm* — Cantor Colburn LLP

(57) ABSTRACT

A liquid crystal display includes a light source, lower and upper substrates facing each other and on the light source, a liquid crystal layer between the lower and upper substrates, an upper polarization layer between the upper substrate and the liquid crystal layer, an upper phase difference layer between the liquid crystal layer and the upper polarization layer and having refractive indexes satisfying the following inequation: $n_{x1} \geq n_{y1} > n_{z1}$, a lower polarization layer disposed between the light source and the lower substrate, and a lower phase difference layer disposed between the light source and the lower substrate and having refractive indexes satisfying the following inequation: $n_{x2} > n_{y2}$ and $n_{x2} > n_{z2}$, where a thickness direction retardation of the upper phase difference layer satisfies the following inequation:

$(-0.6 \times R_{th,cell} + 60) \times n_{avg} - 210 \leq R_{th1} \leq (-0.6 \times R_{th,cell} + 260) \times n_{avg} - 420.$

20 Claims, 11 Drawing Sheets

LIQUID CRYSTAL DISPLAY

CROSS-REFERENCE TO RELATED APPLICATION

This application claims priority to Korean Patent Application No. 10-2016-0170296, filed on Dec. 14, 2016, and all the benefits accruing therefrom under 35 U.S.C. § 119, the content of which in its entirety is herein incorporated by reference.

BACKGROUND

1. Field

The disclosure relates to a liquid crystal display ("LCD").

2. Description of the Related Art

A liquid crystal display ("LCD") is one of the most widely used types of flat panel display. The LCD typically includes two display panels including field generating electrodes and a liquid crystal layer interposed therebetween, and liquid crystal molecules are rotated depending upon an electric field generated between the field generating electrodes to thereby control light transmittance to display an image.

The LCD may display a color by combining light from a light source with a color filter. However, such a color filter may absorb a substantial portion of light emitted from the light source, and thus may lower photoefficiency.

SUMMARY

Recently, research on a photoluminescent liquid crystal display ("LCD") that displays a color by using a light emitting element instead of a color filter has been made.

However, such a photoluminescent LCD may rarely adopt a conventional structure, in which a polarizer is disposed on the light emitting element, due to scattering characteristics of the light emitting element and the like. Accordingly, the photoluminescent LCD may have a relatively low contrast ratio and thus deteriorated display characteristics compared with an LCD using a color filter.

An embodiment is directed to a photoluminescent LCD with high contrast ratio and thus having improved display characteristics.

According to an embodiment, an LCD includes a light source, a lower substrate on the light source, an upper substrate opposite to the lower substrate, a liquid crystal layer between the lower substrate and the upper substrate, an upper polarization layer between the upper substrate and the liquid crystal layer, an upper phase difference layer between the liquid crystal layer and the upper polarization layer and having refractive indexes satisfying the following inequation: $n_{x1} \geq n_{y1} > n_{z1}$ (where $n_{x1}$ denotes a refractive index of the upper phase difference layer at a slow axis thereof, $n_{y1}$ denotes a refractive index of the upper phase difference layer at a fast axis thereof, and $n_{z1}$ denotes a refractive index in a direction perpendicular to the slow axis and the fast axis thereof), a lower polarization layer between the light source and the lower substrate, and a lower phase difference layer between the light source and the lower substrate and having refractive indexes satisfying the following inequation: $n_{x2} > n_{y2}$ and $n_{x2} > n_{z2}$ (where $n_{x2}$ denotes a refractive index of the lower phase difference layer at a slow axis thereof, $n_{y2}$ denotes a refractive index of the lower phase difference layer at a fast axis thereof, and $n_{z2}$ denotes a refractive index in a direction perpendicular to the slow axis and the fast axis thereof). In such an embodiment, a thickness direction retardation of the upper phase difference layer satisfies the following inequation:

$$(-0.6 \times R_{th,cell} + 60) \times n_{avg} - 210 \leq R_{th1} \leq (-0.6 \times R_{th,cell} + 260) \times n_{avg} - 420,$$

where $R_{th1}$ denotes the thickness direction retardation of the upper phase difference layer at a wavelength of 450 nm, $R_{th,cell}$ denotes a thickness direction retardation of the liquid crystal layer at the wavelength of 450 nm, and $n_{avg}$ denotes an average refractive index of the upper phase difference layer.

In an embodiment, the refractive indexes of the upper phase difference layer may satisfy the following inequation: $n_{x1} = n_{y1} > n_{z1}$.

In an embodiment, the refractive indexes of the lower phase difference layer may satisfy the following inequation: $n_{x2} > n_{y2} = n_{z2}$.

In an embodiment, an in-plane retardation of the lower phase difference layer may satisfy the following inequation: 80 nm $\leq R_{in2} \leq$ 170 nm, where $R_{in2}$ denotes the in-plane retardation of the lower phase difference layer at the wavelength of 450 nm.

In an embodiment, the upper phase difference layer may include a heat resistance polymer, a heat resistance liquid crystal, or a combination thereof.

In an embodiment, each of the heat resistance polymer and the heat resistance liquid crystal may have a glass transition temperature of greater than or equal to about 150° C.

In an embodiment, the liquid crystal layer may have a negative dielectric anisotropy.

In an embodiment, the thickness direction retardation ($R_{th,cell}$) of the liquid crystal layer may satisfy the following inequation: $-360$ nm $\leq R_{th,cell} \leq -250$ nm.

In an embodiment, the average refractive index ($n_{avg}$) of the upper phase difference layer may be an average value of $n_{x1}$, $n_{y1}$ and $n_{z1}$, and the average refractive index ($n_{avg}$) of the upper phase difference layer may be in a range from about 1.4 to about 2.0.

In an embodiment, the LCD may further include a color conversion layer on the liquid crystal layer, where the color conversion layer may include a light emitting element which receives first visible light from the light source and emits second visible light.

In an embodiment, the light emitting element may include at least one of a quantum dot and a phosphor.

In an embodiment, the second visible light may have a wavelength equal to greater than a wavelength of the first visible light.

In an embodiment, the first visible light may be blue light and the second visible light may be the blue light, green light, red light, or a combination thereof.

According to another embodiment, an LCD includes a color conversion layer, an upper polarization layer, an upper phase difference layer, a common electrode, a liquid crystal layer, a pixel electrode, a lower phase difference layer, a lower polarization layer and a light source, which are sequentially disposed one on another. In such an embodiment, the upper phase difference layer has refractive indexes satisfying the following inequation: $n_{x1} \geq n_{y1} > n_{z1}$ (where $n_{x1}$ denotes a refractive index of the upper phase difference layer in a direction of a slow axis thereof, $n_{y1}$ denotes a refractive index of the upper phase difference layer in a direction of a fast axis thereof, and $n_{z1}$ denotes a refractive index of the upper phase difference layer in a direction perpendicular to the slow axis and the fast axis thereof), the lower phase difference layer has refractive indexes satisfying the following inequation: $n_{x2} > n_{y2}$ and $n_{x2} > n_{z2}$ (where $n_{x2}$ denotes a refractive index of the lower phase difference layer in a direction of a slow axis thereof, $n_{y2}$ denotes a refractive index of the lower phase difference layer in a direction of a fast axis thereof, $n_{z2}$ denotes a refractive index of the lower phase difference layer in a direction perpendicular to the slow axis and the fast axis thereof). In such an embodiment, a thickness direction retardation of the upper phase difference layer satisfies the following inequation:

$$(-0.6 \times R_{th,cell} + 60) \times n_{avg} - 210 \leq R_{th1} \leq (-0.6 \times R_{th,cell} + 260) \times n_{avg} - 420,$$

where $R_{th1}$ denotes the thickness direction retardation of the upper phase difference layer at a wavelength of 450 nm, $R_{th,cell}$ denotes a thickness direction retardation of the liquid crystal layer at the wavelength of 450 nm, and $n_{avg}$ denotes an average refractive index of the upper phase difference layer.

In an embodiment, an in-plane retardation the lower phase difference layer may satisfy the following inequation: 80 nm $\leq R_{in2} \leq$ 170 nm, where $R_{in2}$ denotes the in-plane retardation of the lower phase difference layer at the wavelength of 450 nm.

In an embodiment, the liquid crystal layer may have a negative dielectric anisotropy.

In an embodiment, the thickness direction retardation ($R_{th,cell}$) of the liquid crystal layer may satisfy the following inequation: $-360$ nm $\leq R_{th,cell} \leq -250$ nm.

In an embodiment, the average refractive index ($n_{avg}$) of the upper phase difference layer may be an average value of $n_{x1}$, $n_{y1}$ and $n_{z1}$, and he average refractive index ($n_{avg}$) of the upper phase difference layer may be in a range from about 1.4 to about 2.0.

In an embodiment, the color conversion layer may include a light emitting element which receives first visible light from the light source and emits second visible light.

In an embodiment, the first visible light may be blue light, and the second visible light may be the blue light, green light, red light, or a combination thereof.

In embodiments of an LCD, as set forth herein, black luminance in all directions may be maintained to be lower than a predetermined level by effectively controlling light leakage in a black mode, and therefore a contrast ratio of the LCD is increased and display characteristics thereof are improved.

BRIEF DESCRIPTION OF THE DRAWINGS

These and/or other features of the invention will become apparent and more readily appreciated from the following detailed description of embodiments thereof, taken in conjunction with the accompanying drawings, in which.

DETAILED DESCRIPTION

Figure 1:
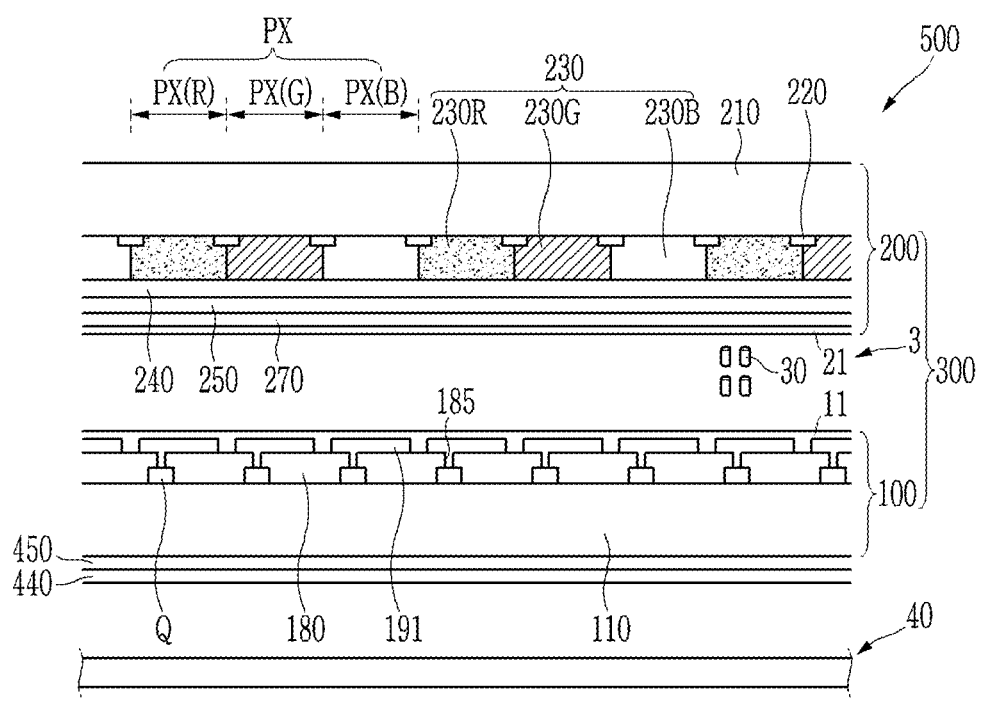
FIG. 1 is a schematic cross-sectional view showing a liquid crystal display ("LCD") according to an embodiment.
Figure 2:
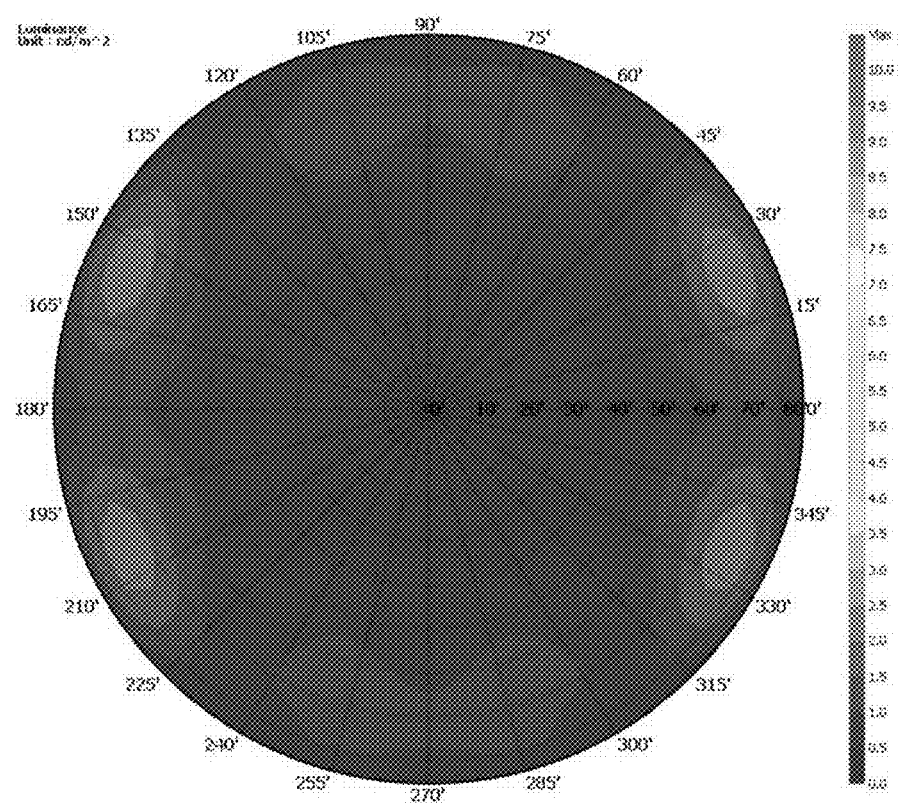
FIGS. 2 to 6 are diagrams showing distributions of black luminance of the LCDs according to Example 1, 9, 14, 17, and 25, respectively.
Figure 3:
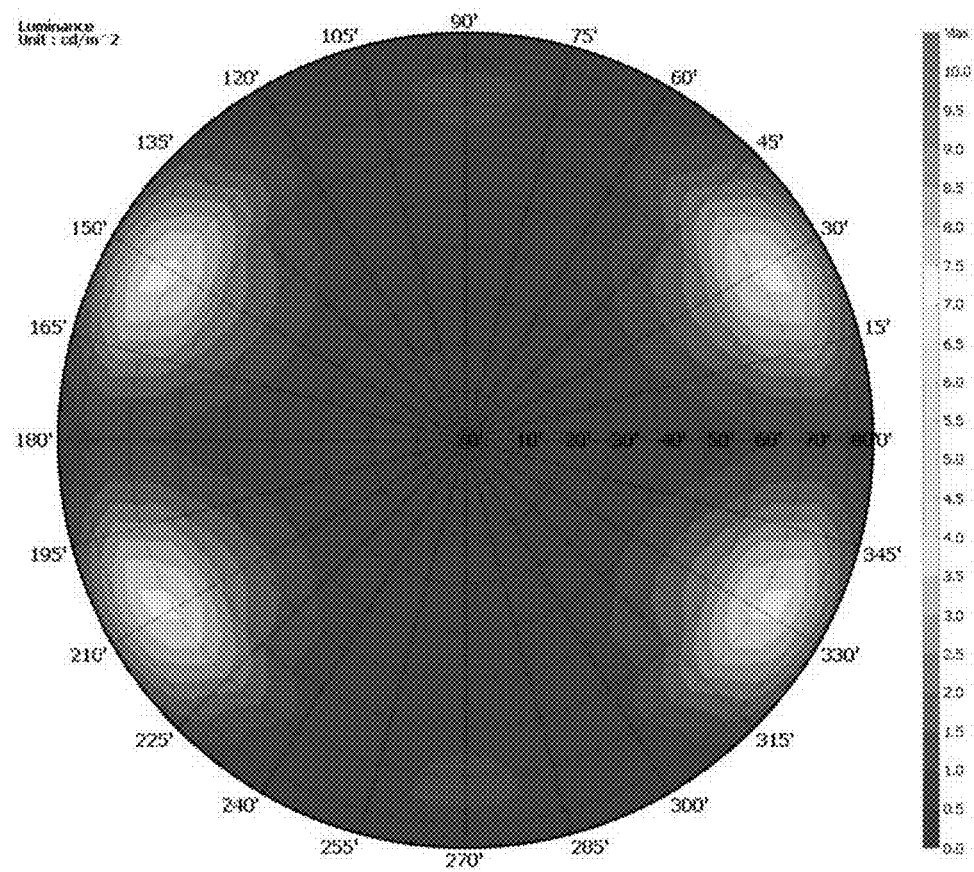
Figure 4:
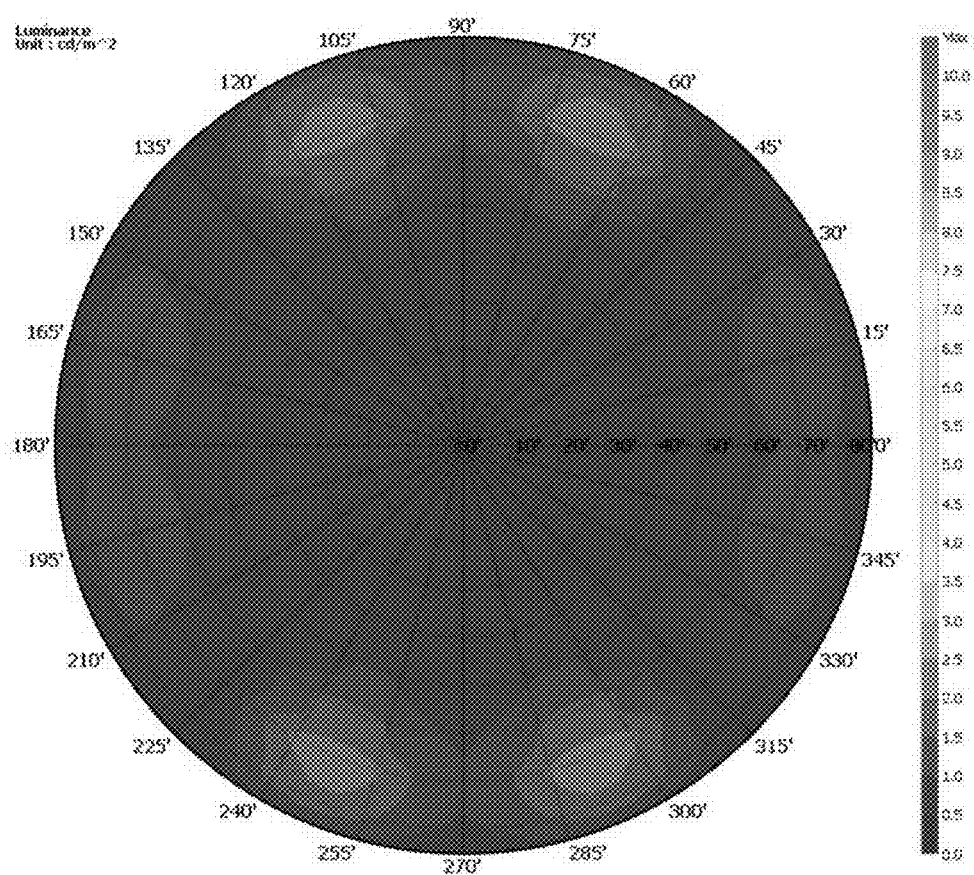
Figure 5:
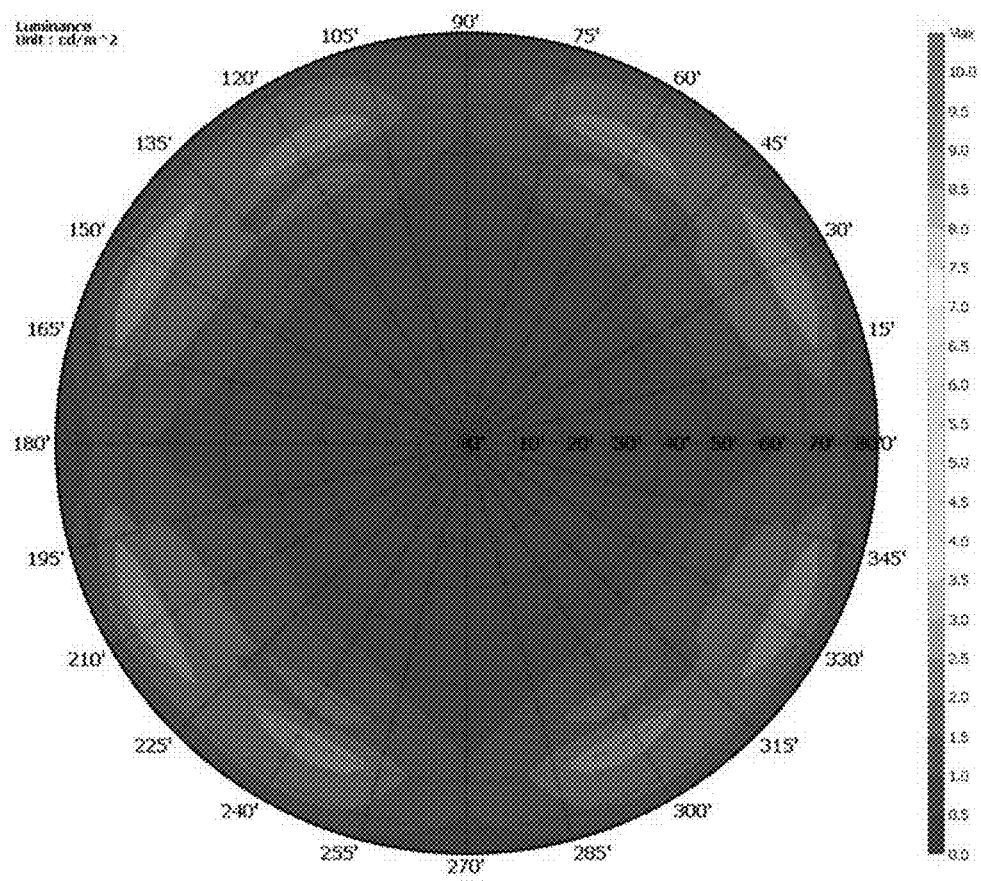
Figure 6:
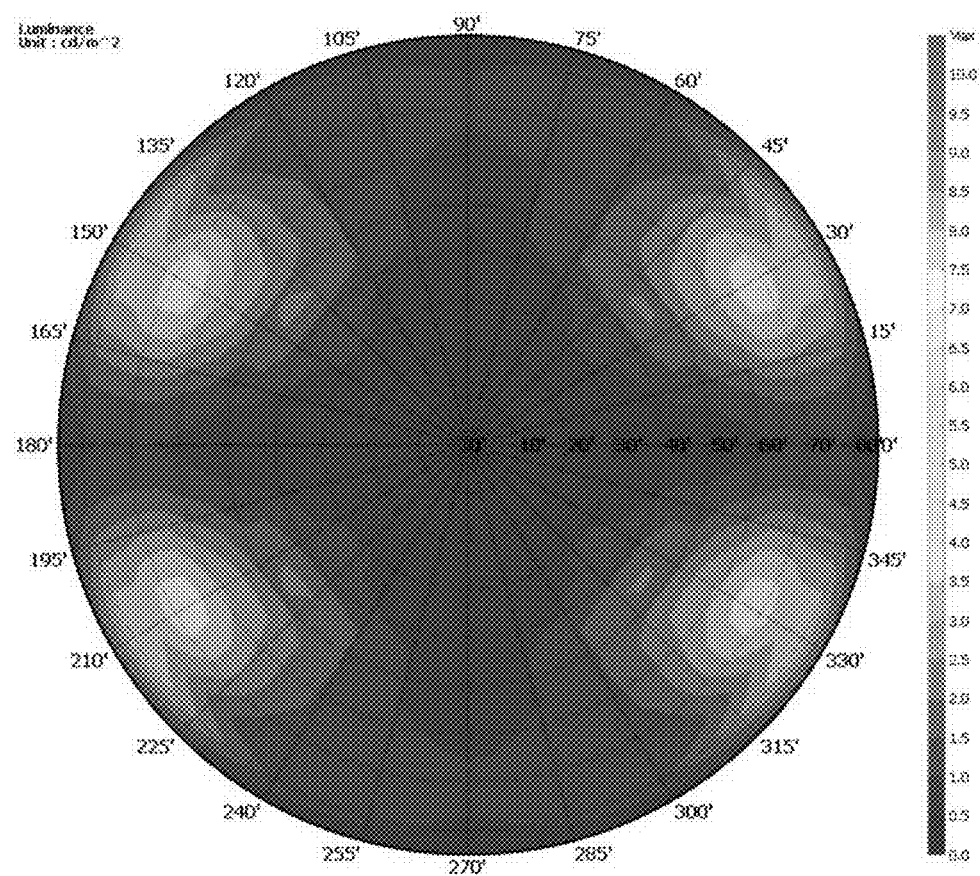
Figure 7:
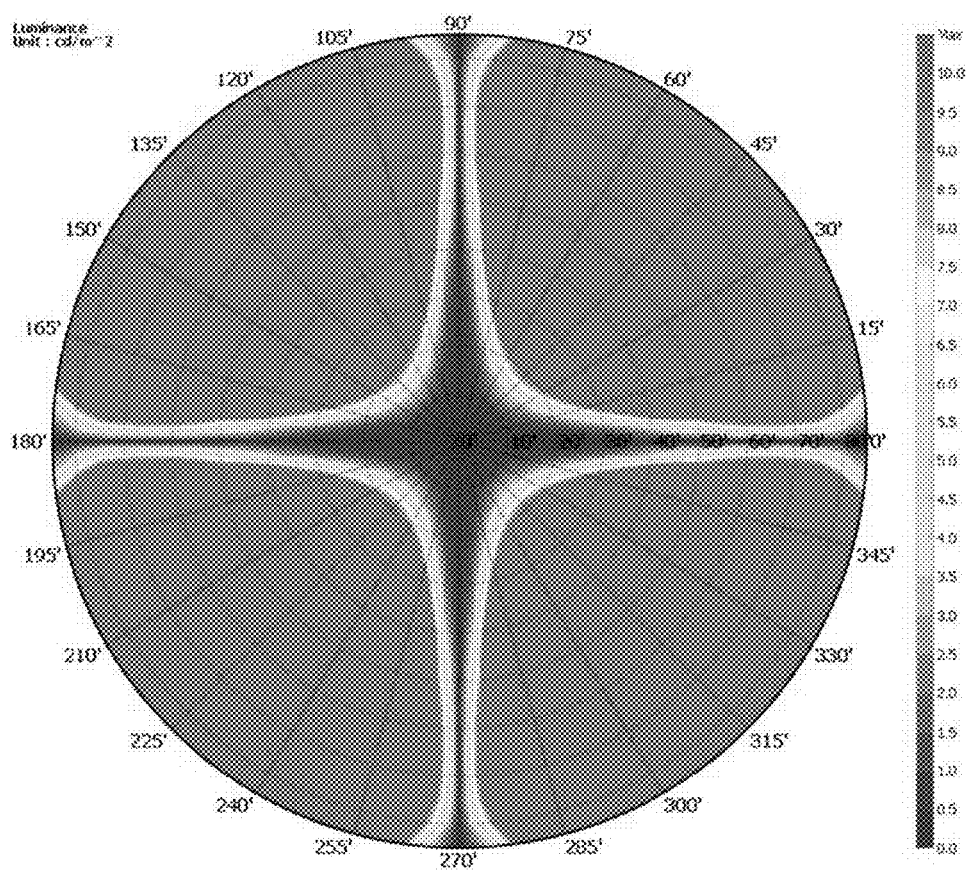
FIGS. 7 to 11 are diagrams showing distributions of black luminance of the LCDs according to Comparative Examples 2, 11, 13, 15, and 17, respectively.
Figure 8:
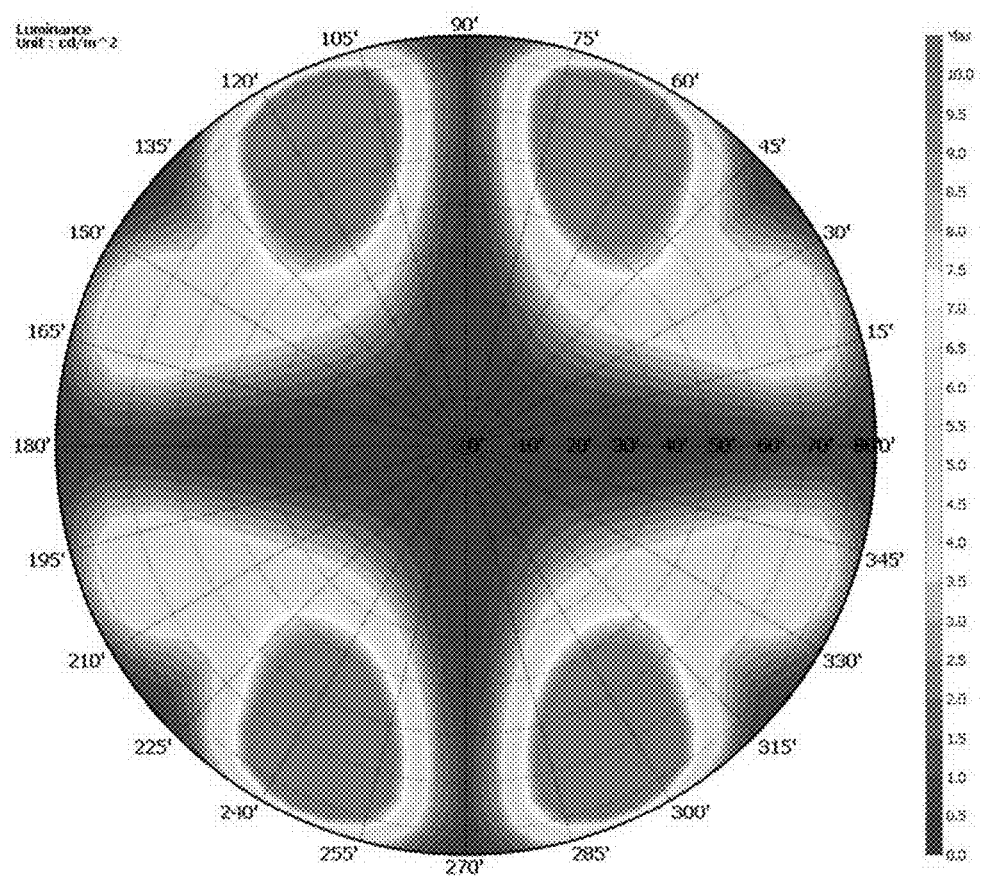
Figure 9:
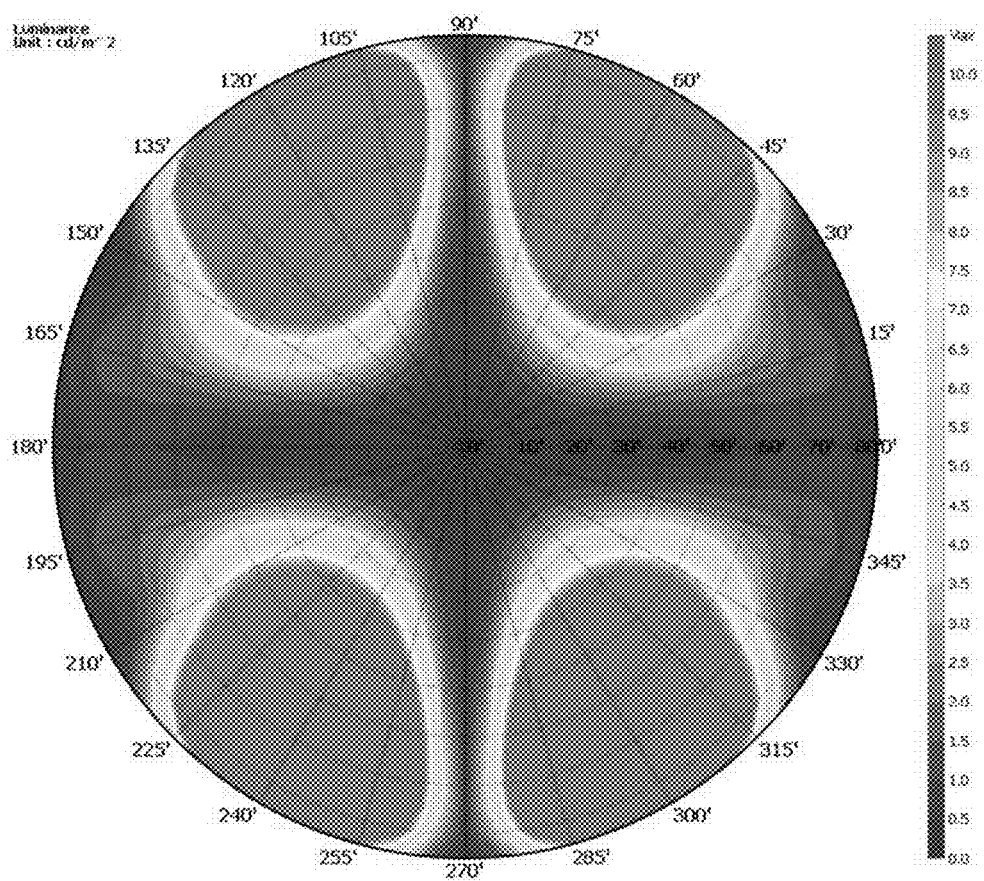
Figure 10:
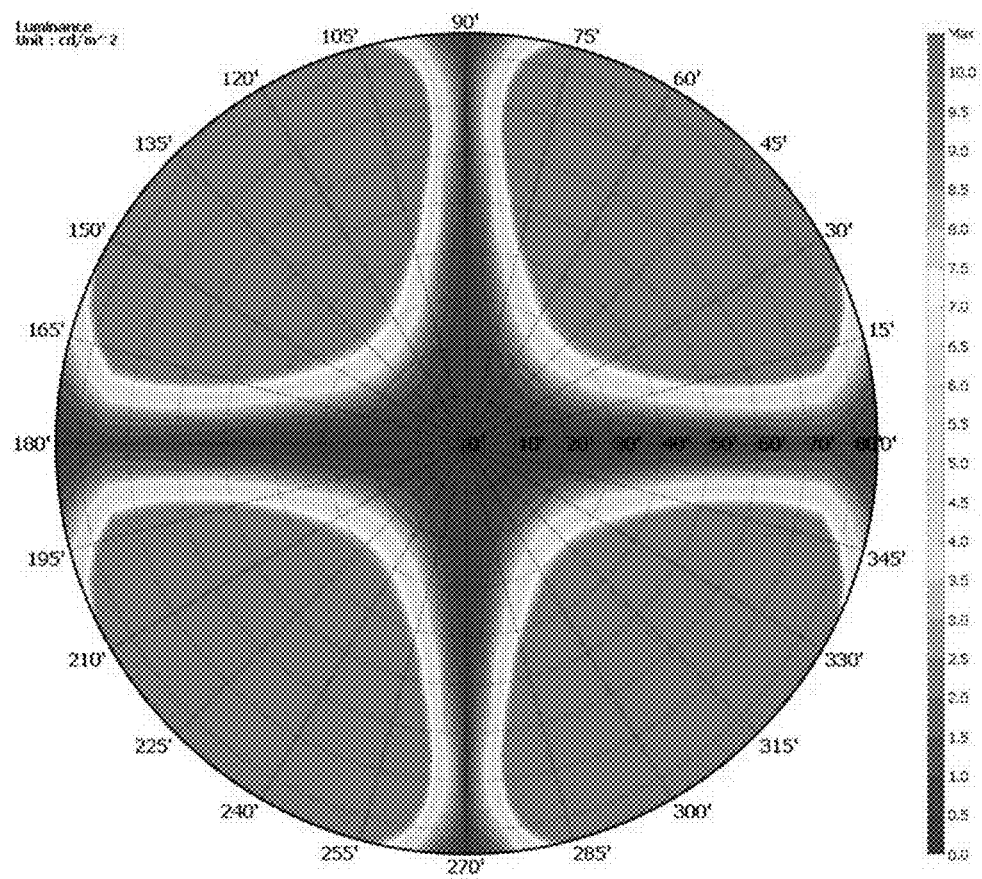
Figure 11:
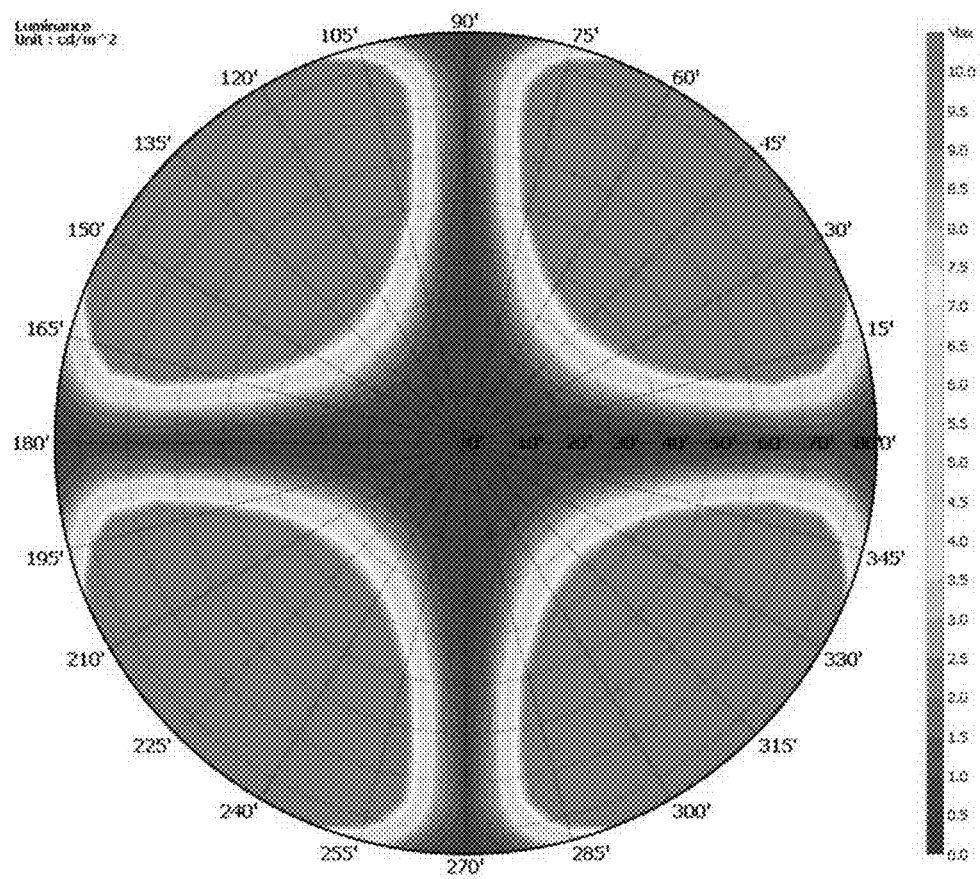

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a liquid crystal display ("LCD") will be described in detail with reference to drawings.

FIG. 1 is a schematic cross-sectional view of an LCD according to an embodiment.

Referring to FIG. 1, an embodiment of the LCD 500 includes a light source 40, an LCD panel 300, a lower polarizing layer 440, and a lower phase difference layer 450.

The light source 40 provides light to the LCD panel 300. The light source 40 may be a planar light source, a dot light source, or a line light source, for example. In an embodiment, the light source 40 may be an edge-type light source or a direct type light source. The light source 40 may include a light emitting region including a light emitting element, a reflector disposed under the light emitting region and which reflects light emitted from the light emitting region, a light guide that guides the light emitted from the light emitting region toward a liquid crystal panel and/or an optical sheet disposed on the light guide, but is not limited thereto.

The light emitting element may be, for example, a fluorescent lamp or a light emitting diode ("LED"), and may generate light in a visible ray region (hereinafter, referred to as 'visible light'), for example, blue light having high frequency.

The LCD panel 300 includes a lower panel 100 disposed on the light source 40, an upper panel 200 disposed opposite to the lower panel 100, and a liquid crystal layer 3 disposed between the lower panel 100 and the upper panel 200.

The lower panel 100 includes a lower substrate 110, a plurality of wires (not shown), a thin film transistor Q, a pixel electrode 191, and an alignment layer 11.

In an embodiment, the lower substrate 110 may be, for example, an insulation substrate such as a glass substrate or a polymer substrate. In an embodiment, where the lower substrate 10 is the polymer substrate, the polymer substrate may include or be made of, for example polyethylene terephthalate, polyethylene naphthalate, polycarbonate, polyacrylate, polyimide, or a combination thereof, but is not limited thereto.

In the lower panel 100, a plurality of gate lines (not shown) that supplies a gate signal and a plurality of data line (not shown) that supplies a data signal may be disposed on the lower substrate 110, and the gate lines and the data lines may extend to cross each other. A plurality of pixels PX are arranged in a matrix form and connected to the gate lines and the data lines.

In the lower panel 100, a plurality of thin film transistors Q is disposed on the lower substrate 110. The thin film transistors Q may include a gate electrode (not shown) connected with the gate lines, a semiconductor (not shown) overlapping with the gate electrode, a gate insulating layer (not shown) disposed between the gate electrode and the semiconductor, a source electrode (not shown) connected with the data lines, and a drain electrode (not shown) facing the source electrode in the center of the semiconductor. In an embodiment, as shown in FIG. 1, each pixel PX includes a single thin film transistor Q, but is not limited thereto. Alternatively, two or more thin film transistors may be disposed in each pixel PX.

In the lower panel 100, a protective layer 180 is disposed on the thin film transistor Q, and a contact hole 185 is defined through the protective layer 180 to expose the thin film transistor Q.

In the lower panel 100, a pixel electrode 191 is disposed on the protective layer 180. The pixel electrode 191 may include or be made of a transparent conductor such as indium tin oxide ("ITO") or indium zinc oxide ("IZO"), and is electrically connected with the thin film transistor Q through the contact hole 185. The pixel electrode 191 may have a predetermined pattern.

In the lower panel 100, an alignment layer 11 is disposed on the pixel electrode 191.

The upper panel 200 includes an upper substrate 210, a color conversion layer 230, an upper polarizing layer 240, an upper phase difference layer 250, a common electrode 270, and an alignment layer 21.

The upper substrate 210 may be, for example, an insulation substrate such as a glass substrate or a polymer substrate, which may be made of, for example polyethylene terephthalate, polyethylene naphthalate, polycarbonate, polyacrylate, polyimide or a combination thereof, but is not limited thereto.

In the upper panel 200, a light blocking member 220 (also referred to as a black matrix) is disposed on a surface (e.g., a bottom surface) of the upper substrate 210. The light blocking member 220 may block light and prevent light leakage between the pixel electrodes 191.

In the upper panel 200, a color conversion layer 230 is disposed on one surface of the upper substrate 210. The color conversion layer 230 receives light in a predetermined wavelength region and emits the light as it is or light in a different wavelength region to display a color. The color conversion layer 230 may include a photoluminescent material that is stimulated by light and emits light by itself, that is, a light emitting element. The light emitting element may be, for example, at least one of a quantum dot and a phosphor.

In one embodiment, for example, the light emitting element may emit light in the same wavelength region as the light emitted from the light source 40 or light in a longer wavelength region. In one embodiment, for example, when the light source 40 emits blue light, the light emitting element may emit the blue light in the same wavelength region or emit light in a longer wavelength region than blue light, for example, red light or green light.

In such an embodiment, high photoconversion efficiency and low power consumption may be realized by including the color conversion layer 230 including a light emitting element. In such an embodiment, the color conversion layer 230 including the light emitting element may cause less light loss according to the absorption and thus increase photoefficiency compared with a conventional color filter including a dye and/or a pigment and thus absorbing a considerable dose of light emitted from the light source 40 and showing low photoefficiency. In such an embodiment, color purity may be increased by an inherent luminous color of the light emitting element. Furthermore, the light emitting element emits light scattering in all directions and may improve viewing angle characteristics.

FIG. 1 shows a red conversion layer 230R including a red light emitting element that emits red light, a green conversion layer 230G including a green light emitting element that emits green light, and a blue conversion layer 230B including a blue light emitting element that emits blue light, but the invention is not limited thereto. In one embodiment, for example, the red conversion layer 230R may emit light having a wavelength region from about 590 nanometers (nm) to about 700 nm, the green conversion layer 230G may emit light in a wavelength region from about 510 nm to about 590 nm, and the blue conversion layer 230B may emit light in a wavelength region from about 380 nm to about 510 nm. In one alternative embodiment, for example, the light emitting element may be a light emitting element that emits cyan light, a light emitting element that emits magenta light, and/or a light emitting element that emits yellow light or additionally include these light emitting elements. In one embodiment, for example, when the light source 40 emits blue light, the blue conversion layer 230B passes the light supplied from the light source 40 as it is and thus display blue. In such an embodiment, the blue conversion layer 230B may be defined by an empty space or include a transparent insulator.

The light emitting element may be, for example, at least one of a phosphor and a quantum dot.

In one embodiment, for example, the red conversion layer 230R may include a red phosphor, for example, at least one selected from $Y_2O_2S:Eu$, $YVO_4:Eu,Bi$, $Y_2O_2S:Eu,Bi$, $SrS:Eu$, $(Ca,Sr)S:Eu$, $SrY_2S_4:Eu$, $CaLa_2S_4:Ce$, $(Sr,Ca,Ba)_3SiO_5:Eu$, $(Sr,Ca,Ba)_2Si_5N_8:Eu$, and $(Ca,Sr)_2AlSiN_3:Eu$. In one embodiment, for example, the green conversion layer 230G may include a green phosphor, for example, at least one selected from $YBO_3:Ce,Tb$, $BaMgAl_{10}O_{17}:Eu,Mn$, $(Sr,Ca,Ba)(Al,Ga)_2S_4:Eu$, $ZnS:Cu,Al$ $Ca_8Mg$ $SiO_{44}Cl_2:Eu,Mn$, $Ba_2SiO_4:Eu$, $(Ba,Sr)_2SiO_4:Eu$, $Ba_2(Mg,Zn)Si_2O_7:Eu$, $(Ba,Sr)Al_2O_4:Eu$, $Sr_2Si_3O_8.2SrCl_2:Eu$, $(Sr,Ca,Ba,Mg)P_2O_7N_8:Eu,Mn$, $(Sr,Ca,Ba,Mg)_3P_2O_8:Eu,Mn$, $Ca_3Sc_2Si_3O_{12}:Ce$, $CaSc_2O_4:Ce$, b-SiAlON:Eu, $Ln_2Si_3O_3N_4:Tb$, and $(Sr,Ca,Ba)Si_2O_2N_2:Eu$.

In one embodiment, for example, the color conversion layer 230 may include a quantum dot. Herein, the quantum dot may be a semiconductor nanocrystal, and may have various shapes, for example, an isotropic semiconductor nanocrystal, a quantum rod, and a quantum plate. Herein, the quantum rod may indicate a quantum dot having an aspect ratio of greater than about 1, for example, an aspect ratio of greater than or equal to about 2, greater than or equal to about 3, or greater than or equal to about 5. In one embodiment, for example, the quantum rod may have an aspect ratio of less than or equal to about 50, an aspect ratio of less than or equal to about 30, or an aspect ratio of less than or equal to about 20. The quantum dot may have, for example, a particle diameter (an average largest particle diameter for a non-spherical shape) in a range from about 1 nm to about 100 nm. The quantum dot may have, for example, a particle diameter in a range from about 1 nm to about 80 nm, a particle diameter in a range from about 1 nm to about 50 nm, or a particle diameter in a range from about 1 nm to 20 nm.

A light emitting wavelength of a quantum dot may be controlled by changing a size and/or a composition thereof. In one embodiment, for example, the quantum dot may include a Group II-VI compound, a Group III-V compound, a Group IV-VI compound, a Group VI compound, or a combination thereof. The Group II-VI compound may be, for example a binary element compound selected from CdSe, CdTe, ZnS, ZnSe, ZnTe, ZnO, HgS, HgSe, HgTe, MgSe, MgS, and a mixture thereof; a ternary element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a quaternary element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The Group III-V compound may include a binary element compound selected from GaN, GaP, GaAs, GaSb, AlN, AlP, AlAs, AlSb, InN, InP, InAs, InSb, and a mixture thereof; a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and a quaternary element compound selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof. The Group IV-VI compound may include a binary element compound selected from SnS, SnSe, SnTe, PbS, PbSe, PbTe, and a mixture thereof; a ternary element compound selected from SnSeS, SnSeTe, SnSTe, PbSeS, PbSeTe, PbSTe, SnPbS, SnPbSe, SnPbTe, and a mixture thereof; and a quaternary element compound selected from SnPbSSe, SnPbSeTe, SnPbSTe, and a mixture thereof. The Group IV compound may include a single-element compound selected from Si, Ge, and a mixture thereof; and a binary element compound selected from SiC, SiGe, and a mixture thereof.

The quantum dot may include the binary element compound, the ternary element compound, or the quaternary element compound in a substantially uniform concentration or partially different concentration distributions. The quantum dot may have a core-shell structure, in which one quantum dot surrounds another quantum dot. In one embodiment, for example, the core and the shell of the quantum dot may have an interface, and an element of at least one of the core or the shell in the interface may have a concentration gradient, such that the concentration of the element(s) of the shell decreases toward the core. In one embodiment, for example, a material composition of the shell of the quantum dot has a higher energy bandgap than a material composition of the core of the quantum dot, and thereby the quantum dot may exhibit a quantum confinement effect. The quantum dot may have a single core of a quantum dot and multi-shells surrounding the core. The multi-shell structure has at least two shells in which each shell may be a single composition, an alloy, or the one having a concentration gradient. In one embodiment, for example, a shell of a multi-shell that is far from the core may have a higher energy bandgap than a shell that is near to the core, and thereby the quantum dot may exhibit a quantum confinement effect.

The quantum dot may have a quantum yield of greater than or equal to about 10%. In one embodiment, for example, the quantum dot may have a quantum yield greater than or equal to about 30%, a quantum yield greater than or equal to about 50%, a quantum yield greater than or equal to about 60%, a quantum yield greater than or equal to about 70%, or a quantum yield greater than or equal to about 90%, but is not limited thereto. The quantum dot has a relatively narrower spectrum. In one embodiment, for example, the quantum dot may have a full width at half maximum ("FWHM") of a light emitting wavelength spectrum of less than or equal to about 45 nm, for example, less than or equal to about 40 nm, or less than or equal to about 30 nm.

The quantum dot may be included in the color conversion layer 230 in a form of a quantum dot-polymer composite, in which the quantum dot is dispersed in the polymer. The polymer may act as a matrix of the quantum dot-polymer composite, and the quantum dot is not particularly limited as long as the polymer does not quench the quantum dot. The polymer may be a transparent polymer, for example, polyvinylpyrrolidone, polystyrene, polyethylene, polypropylene, poly(methyl)acrylate, polymethylmethacrylate, polybutylmethacrylate ("PBMA"), a copolymer thereof, or a combination thereof, but is not limited thereto. The quantum dot-polymer composite may have a single layer structure or a multi-layer structure.

The upper polarizing layer 240 is disposed on a surface (e.g., a bottom surface) of the color conversion layer 230.

The upper polarizing layer 240 may be an in-cell polarizing layer disposed inside the LCD panel 300, and may be disposed on an entire lower surface of the color conversion layer 230. The upper polarizing layer 240 may be disposed under the color conversion layer 230 and provides polarized light to the color conversion layer 230.

In such an embodiment, where the upper polarizing layer 240 is disposed beneath the color conversion layer 230, and a separate polarizing layer typically attached to an outer surface of the LCD panel 300 is not used, light emitted from the light emitting element of the color conversion layer 230 is not influenced by the polarizing layer outside of the LCD panel 300, and resultantly, a contrast ratio may be improved. The light emitting element of the color conversion layer 230 may emit scattered light with changed polarization, and accordingly, when the polarizing layer is disposed on the color conversion layer 230, that is, where the scattered light passes through the polarizing layer, black luminance may be increased, and thus a contrast ratio may be lowered. In such an embodiment, an effect of improving a viewing angle of an LCD may be acquired by the scattered light emitted from the light emitting element of the color conversion layer 230.

Accordingly, an in-cell polarizing layer used as the upper polarizing layer 240 may effectively prevent discoloring or image distortion due to an influence of a polarizing layer attached outside of an LCD panel 300 on light emitted from the light emitting element, but maintain the light emitting characteristics of the light emitting element and thus secure high color purity with reduced light loss. In such an embodiment, the thickness of the in-cell polarizing layer may be less than or equal to about 1 micrometer (μm), and thus may reduce a thickness of an LCD.

The upper polarizing layer 240 may be a linear polarizer that converts light emitted from the light source 40 and passed through the liquid crystal layer 3 into linear polarized light.

In one embodiment, for example, the upper polarizing layer 240 may include or be made of, for example, elongated polyvinyl alcohol ("PVA") according to a method including, for example, elongating a PVA film, adsorbing iodine or a dichroic dye to the PVA film, and borating and washing the PVA film.

In one embodiment, for example, the upper polarizing layer 240 may be a polarizing film prepared, for example, by mixing a polymer and a dichroic dye and melt-blending the polymer with the dichroic dye to melt the polymer at a temperature above the melting point of the polymer. The polymer may be a hydrophobic polymer, for example, polyolefin.

In one embodiment, for example, the upper polarizing layer 240 may be a wire grid polarizer. The wire grid polarizer has a structure in which a plurality of metal wire is aligned in a same predetermined direction, and accordingly, when incident light passes the wire grid polarizer, light parallel to a metal wire is absorbed or reflected, but light perpendicular therewith is transmitted, thereby allowing the wire grid polarizer to function as linear polarized light. Herein, the linear polarized light may be more efficient when a wavelength of light is wider than a gap between the metal wires. The wire grid polarizer may be effectively applied as the in-cell polarizing layer and also, is thin and thus may realize a thin LCD 500.

The upper phase difference layer 250 is disposed on a surface (e.g., a bottom surface) of the upper polarizing layer 240.

The upper phase difference layer 250 may be an in-cell phase difference layer inside of the LCD panel 300.

When the upper phase difference layer 250 is combined with a lower phase difference layer 450 disposed outside of a lower panel 100 to adjust a retardation, a light leakage at the side before light reaches the color conversion layer 230 in a black mode may be substantially reduced or effectively prevented, undesired light emission of the color conversion layer 230 in the black mode may be reduced, and accordingly, black luminance may be decreased, and thus a contrast ratio may be improved.

The upper phase difference layer 250 may include a heat resistance polymer, a heat resistance liquid crystal, or a combination thereof. The heat resistance polymer may include, for example, at least one of polymers having a glass transition temperature (Tg) of greater than or equal to about 150° C. In one embodiment, for example, the heat resistance polymer may include polyimide, polyamic acid, polycarbonate, polyamide, cycloolefin, or a combination thereof, but is not limited thereto. In one embodiment, for example, the heat resistance polymer may have a glass transition temperature (Tg) of greater than or equal to about 180° C., for example, greater than or equal to about 200° C., greater than or equal to about 220° C., or greater than or equal to about 230° C.

In one embodiment, for example, the upper phase difference layer 250 may include a liquid crystal layer including liquid crystals having positive or negative birefringence, and may further include an alignment layer on a surface of the liquid crystal layer.

In one embodiment, for example, the upper phase difference layer 250 may be provided to have a predetermined phase difference by elongating a film made of a heat resistance polymer in a uniaxial or biaxial direction.

In one embodiment, for example, the upper phase difference layer 250 may be provided to have a predetermined retardation to induce linear or surface alignment of a heat resistance polymer or a heat resistance liquid crystal during the drying, when the heat resistance polymer or the heat resistance liquid crystal is prepared as a solution and then, coated and dried.

The common electrode 270 is disposed on a surface (e.g., a bottom surface) of the upper phase difference layer 250. The common electrode 270 may include or be made of a transparent conductor such as ITO or IZO, for example, and may be disposed on a whole surface of the upper phase difference layer 250. The common electrode 270 has a predetermined pattern.

The alignment layer 21 is coated on a surface (e.g., a bottom surface) of the common electrode 270.

The liquid crystal layer 3 including a plurality of liquid crystals 30 is disposed between the lower panel 100 and the upper panel 200. The liquid crystal layer 3 may have positive or negative dielectric anisotropy. In one embodiment, for example, the liquid crystal layer 3 may have negative dielectric anisotropy. In one embodiment, for example, the liquid crystal 30 of the liquid crystal layer 3 may be aligned in a substantially vertical direction to the surfaces of the substrates 110 and 210 when no electric field is generated between the pixel electrode 191 and the common electrode 270. In such an embodiment, the LCD 500 may realize a vertical alignment LCD.

The liquid crystal layer 3 may have in-plane retardation ($R_{in,cell}$) and thickness direction retardation ($R_{th,cell}$). The in-plane retardation ($R_{in,cell}$) retardation is retardation in an in-plane direction of the liquid crystal layer 3, and the thickness direction retardation ($R_{th,cell}$) is retardation in a thickness direction of the liquid crystal layer 3.

The in-plane retardation ($R_{in,cell}$) and the thickness direction retardation ($R_{th,cell}$) may satisfy the following equation: $R_{in,cell}=(n_{x,cell}-n_{y,cell})\times d_{cell}$ and $R_{th,cell}=\{[n_{x,cell}+n_{y,cell}]/2]-n_{z,cell}\}\times d_{cell}$, respectively. Here, $n_{x,cell}$ denotes a refractive index of the liquid crystal layer 3 in a direction of an axis, in which the liquid crystal layer 3 has the highest in-plane retardation (hereinafter referred to as a slow axis), $n_{y,cell}$ denotes a refractive index of the liquid crystal layer 3 in a direction of an axis at which the liquid crystal layer 3 has the lowest in-plane retardation (hereinafter, referred to as a fast axis), $n_{z,cell}$ denotes a refractive index of the liquid crystal layer 3 in a direction perpendicular to the slow axis and fast axis thereof, and $d_{cell}$ denotes a thickness of the liquid crystal layer 30, that is a cell gap. The liquid crystal layer 3 may have an in-plane retardation ($R_{in,cell}$) and a thickness direction retardation ($R_{th,cell}$) within a predetermined range by changing the $n_{x,cell}$, $n_{y,cell}$, $n_{z,cell}$, and/or thickness ($d_{cell}$).

The lower polarizing layer 440 is attached to an outside of the lower panel 100. The lower polarizing layer 440 may be a linear polarizer. The lower polarizing layer 440 polarizes light from the light source 40 and provides polarized light to the liquid crystal layer 3.

In one embodiment, for example, the lower polarizing layer 440 may be made of, for example, elongated PVA according to a method including, for example, elongating a PVA film, adsorbing iodine or a dichroic dye to the PVA film, and borating and washing the PVA film.

In one embodiment, for example, the lower polarizing layer 440 may be a polarizing film prepared, for example, by mixing a polymer and a dichroic dye and melt-blending the polymer with the dichroic dye at a temperature above the melting point of the polymer. The polymer may be a hydrophobic polymer, for example, polyolefin.

In one embodiment, for example, the lower polarizing layer 240 may be a wire grid polarizer. The wire grid polarizer is combined with the upper polarizing layer 240 to realize a thin LCD 500.

The lower phase difference layer 450 may be attached to an outside of the lower panel 100 and may be disposed between the lower panel 100 and the lower polarizing layer 440.

In such an embodiment, as described above, the contrast ratio may be improved by combining the upper phase difference layer 250 with the lower phase difference layer 450 to adjust a retardation and thus reducing or preventing the light leakage at the side before light reaches the color conversion layer 230 in a black mode and accordingly, reducing the undesired light emission of the color conversion layer 230 and thus decreasing black luminance.

The combination of the upper phase difference layer 250 with the lower phase difference layer 450 may be designed to reduce light leakage and increase a contrast ratio.

In one embodiment, for example, the upper phase difference layer 250 may have refractive indexes satisfying the following inequation: $n_{x1} \geq n_{y1} > n_{z1}$, for example, and the lower phase difference layer 450 may have refractive indexes satisfying the following inequation: $n_{x2} > n_{y2}$ and $n_{x2} > n_{z2}$, for example.

Here, $n_{x1}$ denotes a refractive index of the upper phase difference layer 250 in a direction of a slow axis, $n_{y1}$ denotes a refractive index of the upper phase difference layer 250 in a direction of a fast axis, $n_{z1}$ denotes a refractive index of the upper phase difference layer 250 in a direction perpendicular to the slow axis and fast axis, $n_{x2}$ denotes a refractive index of the lower phase difference layer 450 in a direction of a slow axis thereof, $n_{y2}$ denotes a refractive index of the lower phase difference layer 450 in a direction of a fast axis thereof, and $n_{z2}$ denotes a refractive index of the lower phase difference layer 450 in a direction perpendicular to the slow axis and fast axis thereof.

A compensation function to reduce a viewing angle dependency may be effectively performed by combining the upper phase difference layer 250 and the lower phase difference layer 450 having the above refractive indexes.

In one embodiment, for example, the upper phase difference layer 250 may have refractive indexes satisfying the following inequation: $n_{x1}=n_{y1}>n_{z1}$.

Herein, $n_{x1}$ and $n_{y1}$ may be substantially equivalent as well as completely the same as each other. Here, $n_{x1}$ and $n_{y1}$ may be regarded as substantially equivalent when the difference of refractive indexes between $n_{x1}$ and $n_{y1}$ less than or equal to about 0.02, for example, less than or equal to about 0.01.

In one embodiment, for example, the lower phase difference layer 450 may have refractive indexes satisfying the following inequation: $n_{x2}>n_{y2}=n_{z2}$.

Here, $n_{y2}$ and $n_{z2}$ may be substantially equivalent as well as completely the same as each other. Here, $n_{y2}$ and $n_{z2}$ may be regarded as substantially equivalent when the difference of refractive indexes between $n_{y2}$ and $n_{z2}$ less than or equal to about 0.02, for example, less than or equal to about 0.01.

Retardations of the phase difference layer include in-plane retardation ($R_{in}$) and thickness direction retardation ($R_{th}$). The in-plane retardation ($R_{in}$) is retardation in an in-plane direction of the phase difference layer, and the thickness direction retardation ($R_{th}$) is retardation in a thickness direction of the phase difference layer.

The in-plane retardation ($R_{in1}$) and thickness direction retardation ($R_{th1}$) of the upper phase difference layer 250 respectively satisfy the following equations: $R_{in1}=(n_{x1}-n_{y1})\times d_1$ and $R_{th1}=\{[(n_{x1}+n_{y1})/2]-n_{z1}\}\times d_1$, and the in-plane retardation ($R_{in2}$) and thickness direction retardation ($R_{th2}$) of the lower phase difference layer 450 respectively satisfy the following equations: $R_{in2}=(n_{x2}-n_{y2})\times d_2$ and $R_{th2}=\{[(n_{x2}+n_{y2})/2]-n_{z2}\}\times d_2$. Here, $d_1$ and $d_2$ denote the thickness of the upper phase difference layer 250 and the thickness of the lower phase difference layer 450, respectively.

The upper phase difference layer 250 may have in-plane retardation ($R_{in1}$) and thickness direction retardation ($R_{th1}$) within a predetermined range by changing the $n_{x1}$, $n_{y1}$, $n_{z1}$, and/or the thickness ($d_1$), and the lower phase difference layer 450 may have in-plane retardation and thickness direction retardation within a predetermined range by changing the $n_{x2}$, $n_{y2}$, $n_{z2}$, and/or the thickness ($d_2$).

In an embodiment, when the thickness direction retardation ($R_{th1}$) of the upper phase difference layer 250, the average refractive index ($n_{avg}$) of the upper phase difference layer 250 and thickness direction retardation ($R_{th,cell}$) of the liquid crystal layer 3 satisfy a predetermined relationship or inequation, and such an upper phase difference layer 250 and lower phase difference layer 450 are effectively combined, light leakage at a side is effectively reduced, and black luminance in a black mode is thereby decreased.

In one embodiment, for example, the thickness direction retardation ($R_{th1}$) of the upper phase difference layer 250 may satisfy Relationship 1 between the average refractive index of the upper phase difference layer 250 and the thickness direction retardation of the liquid crystal layer 3.

$$(-0.6 \times R_{th,cell}+60) \times n_{avg}-210 \leq R_{th1} \leq (-0.6 \times R_{th,cell}+260) \times n_{avg}-420 \quad \text{[Relationship 1]}$$

In Relationship 1, $R_{th1}$ denotes a thickness direction retardation of the upper phase difference layer at a wavelength of 450 nm, $R_{th,cell}$ denotes a thickness direction retardation of the liquid crystal layer at the wavelength of 450 nm, and $n_{avg}$ denotes an average refractive index of the upper phase difference layer.

When the upper phase difference layer 250 is optically designed to have thickness direction retardation ($R_{th1}$) satisfying the Relationship 1, a light leakage at a side in a black mode is controlled and black luminance in all directions may be maintained to be lower than a predetermined level. Therefore, a compensation function to reduce viewing angle dependency may be effectively performed.

In Relationship 1, the average refractive index of the upper phase difference layer may be an average value of $n_{x1}$, $n_{y1}$ and $n_{z1}$, and may satisfy the following equation: $n_{avg}=(n_{x1}+n_{y1}+n_{z1})/3$.

In one embodiment, for example, the average refractive index of the upper phase difference layer 250 may be in a range from about 1.4 to about 2.0. In one embodiment, for example, the average refractive index of the upper phase difference layer 250 may be in a range from about 1.4 to about 1.7.

In one embodiment, for example, the thickness direction retardation ($R_{th,cell}$) of the liquid crystal layer 3 may satisfy the following inequation: $-360 \text{ nm} \leq R_{th,cell} \leq -250 \text{ nm}$.

Here, the retardation is determined based on light having a reference wavelength of 450 nm, but when a light emitting wavelength of the light source is changed, the reference wavelength may be changed and retardation may be also changed. In one embodiment, for example, the retardation and the reference wavelength may be set to satisfy the following inequation: $0.25 \times \lambda_{BL}$ (nm) $\leq R_{th}(\lambda_{BL}) \leq 0.70 \times \lambda_{BL}$ (nm), where $\lambda_{BL}$ (nm) denotes a maximum wavelength of light emitted from a light source. In one embodiment, for example, the retardation and the reference wavelength may be set to satisfy the following inequation: $0.30 \times \lambda_{BL}$ (nm) $\leq R_{th}(\lambda_{BL}) \leq 0.70 \times \lambda_{BL}$ (nm), but is not limited thereto.

In one embodiment, for example, the thickness direction retardation ($R_{th1}$) of the upper phase difference layer 250 may satisfy Relationship 1-1 between the average refractive index of the upper phase difference layer 250 and the thickness direction retardation of the liquid crystal layer 3.

$$(-0.6 \times R_{th,cell}+60) \times n_{avg}-205 \leq R_{th1} \leq (-0.6 \times R_{th,cell}+260) \times n_{avg}-425 \quad \text{[Relationship 1-1]}$$

In one embodiment, for example, the thickness direction retardation ($R_{th1}$) of the upper phase difference layer 250 may satisfy Relationship 1-2 between the average refractive index of the upper phase difference layer 250 and the thickness direction retardation of the liquid crystal layer 3.

$$(-0.6 \times R_{th,cell}+60) \times n_{avg}-195 \leq R_{th1} \leq (-0.6 \times R_{th,cell}+260) \times n_{avg}-435 \quad \text{[Relationship 1-2]}$$

The lower phase difference layer 450 may have, for example, in-plane retardation satisfying Relationship 2.

$$80 \text{ nm} \leq R_{in2} \leq 170 \text{ nm} \quad \text{[Relationship 2]}$$

In Relationship 2, $R_{in2}$ denotes an in-plane retardation of the lower phase difference layer at the wavelength of 450 nm.

When the lower phase difference layer 450 is optically designed to have in-plane retardation ($R_{in2}$) satisfying Relationship 2, a compensation function to reduce viewing angle dependency may be effectively performed by combining the upper phase difference layer 250.

The lower phase difference layer 450 may have, for example, in-plane retardation satisfying Relationship 2a.

$$90 \text{ nm} \leq R_{in2} \leq 150 \text{ nm} \quad \text{[Relationship 2a]}$$

The lower phase difference layer 450 may have, for example, in-plane retardation satisfying Relationship 2b.

$$100 \text{ nm} \leq R_{in2} \leq 140 \text{ nm} \quad \text{[Relationship 2b]}$$

According to an embodiment, the LCD displays a color by using a color conversion layer including a light emitting element and thus may increase photoefficiency and improve color characteristics. In such an embodiment, light characteristics and viewing angle characteristics of the color conversion layer including a light emitting element may be secured, and thus display to characteristics may be improved by introducing the upper polarizing layer and the upper phase difference layer inside the LCD panel 300, without using a conventional polarizer and phase difference film provided outside of an upper substrate to prevent deterioration of the light characteristics. In such an embodiment, the upper polarizing layer and the upper phase difference layer may be thin and thus may realize a thin LCD. In such an embodiment, a compensation function to reduce viewing angle dependency may be effectively performed by a combination of the upper phase difference layer and the lower phase difference layer.

Hereinafter, embodiments will be described in greater detail with reference to examples. However, these examples are merely exemplary, and embodiments of the disclosure are not limited thereto.

Optical Simulation

The following structures of an LCD are simulated and optical simulations are performed.

The optical simulation is performed by using a Techwiz program (Sanayi System Co., Ltd.) to obtain a black luminance distribution for light at the wavelength of 450 nm and at an azimuthal angle of about 0° to about 360° and a side angle of about 0° to about 90°, and an average thereof is calculated.

Examples 1 to 154

An optical simulation about an LCD including: an upper substrate (glass); an upper polarizing layer; an upper phase difference layer; a homeotropic liquid crystal layer; a lower substrate (glass); a lower phase difference layer; a lower polarizing layer; and a blue light source sequentially disposed from an observer, is performed.

Common input variables of each layer are as follows.
Refractive indexes of the upper and lower substrates (glass): 1.5.
Thicknesses of the upper and lower substrates (glass): 500 μm.
Transmittance of the upper and lower polarizing layers: 42.45%.
Degrees of polarization of the upper and lower polarizing layers: 99.99%.
Blue light source: 450 nm short wavelength light source.
The optical simulation is performed at various ranges satisfying the following optical condition.
Vertical alignment liquid crystal layer: $R_{th,cell}=-360$ nm to $-250$ nm.

Upper phase difference layer: $n_{x1}=n_{y1}>n_{z1}$, $\Delta n=0.022$ to 0.052, $n_{avg}=1.4\text{-}1.7$, $R_{th1}$ satisfying Relationship 1.
Lower phase difference layer: $n_{x2}>n_{y2}=n_{z2}$, $R_{in2}=80$ nm-170 nm.

Comparative Examples 1 to 5

An optical simulation is performed about the same LCD as Example 1 except for including no upper phase difference layer and lower phase difference layer.

Comparative Examples 6 to 10

An optical simulation is performed about the same LCD as Example 1 except for including no upper phase difference layer and changing the optical condition of the lower phase difference layer as follows.
Lower phase difference layer: $n_{x2}>n_{y2}=n_{z2}$, $R_{in2}=120$ nm, $R_{th2}=60$ nm.

Comparative Examples 11 to 13

An optical simulation is performed about the same LCD as Example 1 except for including no upper phase difference layer and changing the optical condition of the lower phase difference layer as follows.
Lower phase difference layer: $n_{x2}\neq n_{y2}>n_{z2}$, $R_{in2}=65$ nm, $R_{th2}=250$ nm.

Comparative Examples 14 to 33

An optical simulation is performed about the same LCD as Example 1 except for including the upper phase difference layer and the lower phase difference layer and changing the optical condition of the lower phase difference layer as follows.
Vertical alignment liquid crystal layer: $R_{th,cell}=-360$ nm to $-250$ nm,
Upper phase difference layer: $n_{x1}=n_{y1}>n_{z1}$, $\Delta n=0.022$ to 0.052, $n_{avg}=1.4\text{-}1.7$, and $R_{th1}$ that does not satisfy Relationship 1.
Lower phase difference layer: $n_{x2}>n_{y2}=n_{z2}$, $R_{in2}=110$ nm-190 nm.

Evaluation 1

Average black luminance of the LCDs according to Examples and Comparative Examples is evaluated.

The average black luminance may be obtained as an average of black luminance at an azimuthal angle of about 0° to about 360° and a side angle of about 0° to about 90° for light in the wavelength of 450 nm. As the average black luminance is lower, light leakage is suppressed and an LCD may be expected to have a higher contrast ratio.

The results are shown in Table 1.

TABLE 1

| | Liquid crystal layer $R_{th,cell}$ (nm) | Upper phase difference layer | | | Lower phase difference layer $R_{in2}$ (nm) | Average black luminance (cd/m²) |
|---|---|---|---|---|---|---|
| | | $\Delta n$ | $n_{avg}$ | $R_{th1}$ (nm) | | |
| Example 1 | −295 | 0.052 | 1.40 | 160 | 120 | 0.36 |
| Example 2 | −295 | 0.052 | 1.40 | 170 | 130 | 0.77 |
| Example 3 | −295 | 0.052 | 1.40 | 150 | 130 | 0.69 |
| Example 4 | −295 | 0.052 | 1.40 | 150 | 110 | 0.69 |
| Example 5 | −295 | 0.052 | 1.40 | 150 | 120 | 0.51 |
| Example 6 | −295 | 0.052 | 1.40 | 140 | 120 | 1.17 |
| Example 7 | −295 | 0.052 | 1.50 | 190 | 120 | 0.32 |
| Example 8 | −295 | 0.052 | 1.50 | 180 | 110 | 0.66 |
| Example 9 | −295 | 0.052 | 1.50 | 200 | 130 | 0.57 |
| Example 10 | −295 | 0.052 | 1.50 | 180 | 130 | 0.70 |
| Example 11 | −295 | 0.052 | 1.50 | 200 | 120 | 0.49 |
| Example 12 | −295 | 0.052 | 1.50 | 210 | 120 | 1.03 |
| Example 13 | −295 | 0.052 | 1.50 | 170 | 120 | 1.07 |
| Example 14 | −295 | 0.052 | 1.60 | 220 | 120 | 0.34 |
| Example 15 | −295 | 0.052 | 1.60 | 240 | 130 | 0.71 |
| Example 16 | −295 | 0.052 | 1.60 | 240 | 120 | 0.64 |
| Example 17 | −295 | 0.052 | 1.60 | 230 | 110 | 0.50 |
| Example 18 | −295 | 0.052 | 1.60 | 230 | 100 | 0.96 |
| Example 19 | −295 | 0.052 | 1.60 | 210 | 110 | 0.75 |
| Example 20 | −295 | 0.052 | 1.60 | 210 | 120 | 0.59 |
| Example 21 | −295 | 0.052 | 1.60 | 200 | 120 | 1.09 |
| Example 22 | −295 | 0.052 | 1.70 | 260 | 120 | 0.33 |
| Example 23 | −295 | 0.052 | 1.70 | 250 | 110 | 0.62 |
| Example 24 | −295 | 0.052 | 1.70 | 270 | 130 | 0.51 |
| Example 25 | −295 | 0.052 | 1.70 | 280 | 120 | 0.71 |
| Example 26 | −295 | 0.052 | 1.70 | 240 | 120 | 0.75 |
| Example 27 | −295 | 0.052 | 1.70 | 290 | 120 | 1.20 |
| Example 28 | −295 | 0.052 | 1.70 | 230 | 120 | 1.24 |
| Example 29 | −295 | 0.040 | 1.40 | 160 | 120 | 0.36 |
| Example 30 | −295 | 0.040 | 1.40 | 160 | 110 | 0.53 |
| Example 31 | −295 | 0.040 | 1.40 | 170 | 130 | 0.70 |
| Example 32 | −295 | 0.040 | 1.40 | 150 | 110 | 0.76 |
| Example 33 | −295 | 0.040 | 1.40 | 150 | 120 | 0.58 |
| Example 34 | −295 | 0.040 | 1.40 | 170 | 110 | 0.82 |
| Example 35 | −295 | 0.040 | 1.40 | 150 | 130 | 0.73 |
| Example 36 | −295 | 0.040 | 1.50 | 190 | 120 | 0.32 |
| Example 37 | −295 | 0.040 | 1.50 | 200 | 130 | 0.55 |
| Example 38 | −295 | 0.040 | 1.50 | 200 | 120 | 0.45 |
| Example 39 | −295 | 0.040 | 1.50 | 180 | 110 | 0.70 |
| Example 40 | −295 | 0.040 | 1.60 | 230 | 120 | 0.34 |
| Example 41 | −295 | 0.040 | 1.60 | 220 | 110 | 0.51 |
| Example 42 | −295 | 0.040 | 1.60 | 220 | 120 | 0.36 |
| Example 43 | −295 | 0.040 | 1.60 | 240 | 130 | 0.66 |
| Example 44 | −295 | 0.040 | 1.70 | 260 | 120 | 0.34 |
| Example 45 | −295 | 0.040 | 1.70 | 270 | 130 | 0.50 |
| Example 46 | −295 | 0.040 | 1.70 | 250 | 130 | 0.60 |
| Example 47 | −295 | 0.040 | 1.70 | 270 | 110 | 0.57 |
| Example 48 | −295 | 0.040 | 1.70 | 270 | 120 | 0.40 |
| Example 49 | −295 | 0.022 | 1.40 | 160 | 120 | 0.36 |
| Example 50 | −295 | 0.022 | 1.40 | 170 | 130 | 0.58 |
| Example 51 | −295 | 0.022 | 1.40 | 150 | 130 | 0.82 |
| Example 52 | −295 | 0.022 | 1.40 | 170 | 110 | 0.73 |
| Example 53 | −295 | 0.022 | 1.50 | 190 | 120 | 0.34 |
| Example 54 | −295 | 0.022 | 1.50 | 200 | 130 | 0.49 |
| Example 55 | −295 | 0.022 | 1.50 | 180 | 110 | 0.79 |
| Example 56 | −295 | 0.022 | 1.60 | 230 | 120 | 0.32 |
| Example 57 | −295 | 0.022 | 1.60 | 240 | 130 | 0.58 |
| Example 58 | −295 | 0.022 | 1.60 | 210 | 120 | 0.73 |
| Example 59 | −295 | 0.022 | 1.60 | 220 | 120 | 0.39 |
| Example 60 | −295 | 0.022 | 1.60 | 250 | 120 | 0.94 |
| Example 61 | −295 | 0.022 | 1.60 | 220 | 110 | 0.55 |
| Example 62 | −295 | 0.022 | 1.70 | 260 | 120 | 0.34 |
| Example 63 | −295 | 0.022 | 1.70 | 270 | 130 | 0.46 |
| Example 64 | −295 | 0.022 | 1.70 | 250 | 130 | 0.68 |
| Example 65 | −295 | 0.022 | 1.70 | 270 | 110 | 0.52 |
| Example 66 | −295 | 0.022 | 1.70 | 280 | 120 | 0.57 |
| Example 67 | −295 | 0.022 | 1.70 | 240 | 120 | 0.87 |
| Example 68 | −295 | 0.022 | 1.70 | 290 | 120 | 0.98 |
| Example 69 | −275 | 0.052 | 1.40 | 140 | 120 | 0.38 |
| Example 70 | −275 | 0.052 | 1.40 | 150 | 130 | 0.53 |
| Example 71 | −275 | 0.052 | 1.40 | 130 | 130 | 1.02 |
| Example 72 | −275 | 0.052 | 1.40 | 140 | 130 | 0.52 |
| Example 73 | −275 | 0.052 | 1.40 | 140 | 110 | 0.63 |
| Example 74 | −275 | 0.052 | 1.40 | 150 | 120 | 0.45 |
| Example 75 | −275 | 0.052 | 1.50 | 170 | 120 | 0.33 |
| Example 76 | −275 | 0.052 | 1.50 | 180 | 130 | 0.51 |
| Example 77 | −275 | 0.052 | 1.50 | 160 | 110 | 0.77 |
| Example 78 | −275 | 0.052 | 1.50 | 180 | 120 | 0.40 |
| Example 79 | −275 | 0.052 | 1.50 | 190 | 120 | 0.84 |

TABLE 1-continued

| | Liquid crystal layer $R_{th,cell}$ (nm) | Upper phase difference layer $\Delta n$ | Upper phase difference layer $n_{avg}$ | Upper phase difference layer $R_{th1}$ (nm) | Lower phase difference layer $R_{in2}$ (nm) | Average black luminance (cd/m²) |
|---|---|---|---|---|---|---|
| Example 80 | −275 | 0.052 | 1.60 | 200 | 120 | 0.33 |
| Example 81 | −275 | 0.052 | 1.60 | 210 | 110 | 0.51 |
| Example 82 | −275 | 0.052 | 1.60 | 190 | 130 | 0.75 |
| Example 83 | −275 | 0.052 | 1.60 | 210 | 140 | 0.79 |
| Example 84 | −275 | 0.052 | 1.70 | 240 | 120 | 0.34 |
| Example 85 | −275 | 0.052 | 1.70 | 220 | 110 | 0.73 |
| Example 86 | −275 | 0.052 | 1.70 | 250 | 130 | 0.59 |
| Example 87 | −275 | 0.052 | 1.70 | 230 | 130 | 0.51 |
| Example 88 | −275 | 0.052 | 1.70 | 260 | 130 | 0.95 |
| Example 89 | −275 | 0.052 | 1.70 | 230 | 110 | 0.55 |
| Example 90 | −275 | 0.052 | 1.70 | 210 | 120 | 0.97 |
| Example 91 | −315 | 0.052 | 1.40 | 170 | 120 | 0.37 |
| Example 92 | −315 | 0.052 | 1.40 | 180 | 130 | 0.59 |
| Example 93 | −315 | 0.052 | 1.40 | 160 | 110 | 0.92 |
| Example 94 | −315 | 0.052 | 1.40 | 180 | 120 | 0.51 |
| Example 95 | −315 | 0.052 | 1.50 | 210 | 120 | 0.33 |
| Example 96 | −315 | 0.052 | 1.50 | 200 | 110 | 0.57 |
| Example 97 | −315 | 0.052 | 1.50 | 220 | 130 | 0.68 |
| Example 98 | −315 | 0.052 | 1.50 | 200 | 120 | 0.41 |
| Example 99 | −315 | 0.052 | 1.50 | 190 | 120 | 0.87 |
| Example 100 | −315 | 0.052 | 1.60 | 240 | 120 | 0.36 |
| Example 101 | −315 | 0.052 | 1.60 | 250 | 120 | 0.37 |
| Example 102 | −315 | 0.052 | 1.60 | 250 | 110 | 0.53 |
| Example 103 | −315 | 0.052 | 1.60 | 260 | 110 | 0.84 |
| Example 104 | −315 | 0.052 | 1.60 | 260 | 130 | 0.70 |
| Example 105 | −315 | 0.052 | 1.60 | 230 | 120 | 0.63 |
| Example 106 | −315 | 0.052 | 1.60 | 230 | 110 | 0.77 |
| Example 107 | −315 | 0.052 | 1.60 | 220 | 120 | 1.14 |
| Example 108 | −315 | 0.052 | 1.60 | 270 | 120 | 1.17 |
| Example 109 | −315 | 0.052 | 1.60 | 240 | 100 | 0.97 |
| Example 110 | −315 | 0.052 | 1.60 | 250 | 100 | 0.98 |
| Example 111 | −315 | 0.052 | 1.60 | 250 | 140 | 0.81 |
| Example 112 | −315 | 0.052 | 1.60 | 260 | 140 | 0.97 |
| Example 113 | −315 | 0.052 | 1.70 | 280 | 120 | 0.37 |
| Example 114 | −315 | 0.052 | 1.70 | 300 | 130 | 0.66 |
| Example 115 | −315 | 0.052 | 1.70 | 260 | 110 | 1.04 |
| Example 116 | −315 | 0.052 | 1.70 | 260 | 120 | 0.91 |
| Example 117 | −315 | 0.052 | 1.70 | 290 | 120 | 0.39 |
| Example 118 | −315 | 0.052 | 1.70 | 310 | 120 | 1.02 |
| Example 119 | −255 | 0.052 | 1.40 | 130 | 120 | 0.34 |
| Example 120 | −255 | 0.052 | 1.40 | 120 | 130 | 0.79 |
| Example 121 | −255 | 0.052 | 1.40 | 140 | 130 | 0.68 |
| Example 122 | −255 | 0.052 | 1.40 | 120 | 120 | 0.62 |
| Example 123 | −255 | 0.052 | 1.40 | 140 | 110 | 0.81 |
| Example 124 | −255 | 0.052 | 1.50 | 160 | 120 | 0.34 |
| Example 125 | −255 | 0.052 | 1.50 | 150 | 110 | 0.52 |
| Example 126 | −255 | 0.052 | 1.50 | 150 | 120 | 0.37 |
| Example 127 | −255 | 0.052 | 1.50 | 150 | 130 | 0.53 |
| Example 128 | −255 | 0.052 | 1.50 | 170 | 130 | 0.75 |
| Example 129 | −255 | 0.052 | 1.60 | 180 | 120 | 0.32 |
| Example 130 | −255 | 0.052 | 1.60 | 190 | 130 | 0.47 |
| Example 131 | −255 | 0.052 | 1.60 | 170 | 110 | 0.70 |
| Example 132 | −255 | 0.052 | 1.70 | 210 | 120 | 0.31 |
| Example 133 | −255 | 0.052 | 1.70 | 220 | 130 | 0.47 |
| Example 134 | −255 | 0.052 | 1.70 | 200 | 110 | 0.63 |
| Example 135 | −255 | 0.052 | 1.70 | 220 | 120 | 0.37 |
| Example 136 | −255 | 0.052 | 1.70 | 200 | 130 | 0.63 |
| Example 137 | −335 | 0.052 | 1.40 | 190 | 120 | 0.39 |
| Example 138 | −335 | 0.052 | 1.40 | 180 | 110 | 0.65 |
| Example 139 | −335 | 0.052 | 1.40 | 180 | 120 | 0.47 |
| Example 140 | −335 | 0.052 | 1.40 | 200 | 130 | 0.87 |
| Example 141 | −335 | 0.052 | 1.40 | 180 | 130 | 0.64 |
| Example 142 | −335 | 0.052 | 1.50 | 220 | 120 | 0.36 |
| Example 143 | −335 | 0.052 | 1.50 | 230 | 130 | 0.47 |
| Example 144 | −335 | 0.052 | 1.50 | 210 | 110 | 0.84 |
| Example 145 | −335 | 0.052 | 1.60 | 260 | 120 | 0.34 |
| Example 146 | −335 | 0.052 | 1.60 | 250 | 110 | 0.73 |
| Example 147 | −335 | 0.052 | 1.60 | 270 | 130 | 0.46 |
| Example 148 | −335 | 0.052 | 1.70 | 310 | 120 | 0.37 |
| Example 149 | −335 | 0.052 | 1.70 | 300 | 110 | 0.59 |
| Example 150 | −335 | 0.052 | 1.70 | 320 | 130 | 0.57 |
| Example 151 | −335 | 0.052 | 1.70 | 320 | 110 | 0.55 |
| Example 152 | −335 | 0.052 | 1.70 | 330 | 120 | 0.90 |
| Example 153 | −335 | 0.052 | 1.70 | 280 | 120 | 1.03 |
| Example 154 | −335 | 0.052 | 1.70 | 290 | 120 | 0.63 |
| Comparative Example 1 | −255 | — | — | — | — | 82.10 |
| Comparative Example 2 | −275 | — | — | — | — | 91.56 |
| Comparative Example 3 | −295 | — | — | — | — | 101.39 |
| Comparative Example 4 | −315 | — | — | — | — | 111.42 |
| Comparative Example 5 | −335 | — | — | — | — | 121.37 |
| Comparative Example 6 | −255 | — | — | — | 120 | 40.73 |
| Comparative Example 7 | −275 | — | — | — | 120 | 49.17 |
| Comparative Example 8 | −295 | — | — | — | 120 | 58.26 |

TABLE 1-continued

| | Liquid crystal layer $R_{th,cell}$ | Upper phase difference layer | | | Lower phase difference layer | Average black luminance |
|---|---|---|---|---|---|---|
| | (nm) | $\Delta n$ | $n_{avg}$ | $R_{th1}$ (nm) | $R_{in2}$ (nm) | (cd/m$^2$) |
| Comparative Example 9 | −315 | — | — | — | 120 | 67.72 |
| Comparative Example 10 | −335 | — | — | — | 120 | 77.30 |
| Comparative Example 11 | −295 | — | — | — | 65 | 3.26 |
| Comparative Example 12 | −315 | — | — | — | 65 | 4.22 |
| Comparative Example 13 | −335 | — | — | — | 65 | 6.95 |
| Comparative Example 14 | −295 | 0.052 | 1.60 | 140 | 120 | 9.32 |
| Comparative Example 15 | −295 | 0.052 | 1.60 | 140 | 170 | 16.25 |
| Comparative Example 16 | −275 | 0.052 | 1.60 | 140 | 170 | 11.71 |
| Comparative Example 17 | −275 | 0.052 | 1.60 | 300 | 130 | 12.03 |
| Comparative Example 18 | −275 | 0.052 | 1.60 | 280 | 110 | 8.04 |
| Comparative Example 19 | −315 | 0.052 | 1.60 | 140 | 150 | 16.90 |
| Comparative Example 20 | −315 | 0.052 | 1.60 | 160 | 170 | 16.31 |
| Comparative Example 21 | −315 | 0.052 | 1.60 | 160 | 130 | 9.72 |
| Comparative Example 22 | −275 | 0.052 | 1.40 | 80 | 90 | 18.46 |
| Comparative Example 23 | −275 | 0.052 | 1.40 | 100 | 150 | 11.70 |
| Comparative Example 24 | −315 | 0.052 | 1.40 | 120 | 150 | 9.97 |
| Comparative Example 25 | −275 | 0.052 | 1.50 | 120 | 150 | 7.90 |
| Comparative Example 26 | −295 | 0.052 | 1.50 | 260 | 120 | 9.22 |
| Comparative Example 27 | −315 | 0.052 | 1.50 | 140 | 130 | 8.84 |
| Comparative Example 28 | −275 | 0.052 | 1.70 | 120 | 110 | 13.32 |
| Comparative Example 29 | −275 | 0.052 | 1.70 | 120 | 130 | 13.44 |
| Comparative Example 31 | −275 | 0.052 | 1.70 | 360 | 110 | 15.11 |
| Comparative Example 32 | −295 | 0.052 | 1.60 | 300 | 110 | 8.11 |
| Comparative Example 33 | −315 | 0.052 | 1.60 | 140 | 110 | 14.37 |

Referring to Table 1, the LCDs according to Examples show low average black luminance compared with the LCDs according to Comparative Examples. As shown in Table 1, light leakage at a side direction is reduced and a compensation function is effectively performed by setting retardation of the upper phase difference layer to satisfy a predetermined relationship between the average refractive index of the upper phase difference layer and the thickness direction retardation of the liquid crystal layer and setting retardation of the lower phase difference layer to satisfy a predetermined range. In addition, the LCDs according to Examples are expected to show an improved contrast ratio compared with the LCDs according to Comparative Examples.

Evaluation 2

The distributions of black luminances of the LCDs Examples and Comparative Examples are evaluated at an azimuthal angle of about 0° to about 360° and a side angle of about 0° to about 90° for light in the wavelength of 450 nm.

FIGS. 2 to 6 are diagrams showing distributions of black luminance of the LCDs according to Example 1, 9, 14, 17 and 25, respectively, and FIGS. 7 to 11 are diagrams showing distributions of black luminance of the LCDs according to Comparative Examples 2, 11, 13, 15 and 17, respectively A sum of the black luminances at all the azimuthal angles and all the tilt angles may be proportional with a light dose reaching a color conversion layer in a black mode, and as the sum of the black luminances is smaller in the black mode, a light dose light-emitted by the color conversion layer in the black mode is decreased, and thus the black luminance may be lowered. Accordingly, as the black luminance is lower, an LCD may be expected to have a higher contrast ratio.

Referring to FIGS. 2 to 11, the LCDs according to Examples maintain low black luminance at all the azimuthal angles and all the tilt angles and thus show a high contrast ratio, compared with the LCDs according to Comparative Examples.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a light source;
   a lower substrate on the light source;
   an upper substrate opposite to the lower substrate;
   a liquid crystal layer between the lower substrate and the upper substrate;
   an upper polarization layer between the upper substrate and the liquid crystal layer,
   an upper phase difference layer between the liquid crystal layer and the upper polarization layer, and having refractive indexes satisfying the following inequation: $n_{x1} \geq n_{y1} > n_{z1}$, wherein $n_{x1}$ denotes a refractive index of the upper phase difference layer in a direction of a slow axis thereof, $n_{y1}$ denotes a refractive index of the upper phase difference layer in a direction of a fast axis thereof, $n_{z1}$ denotes a refractive index of the upper phase difference layer in a direction perpendicular to the slow axis and the fast axis thereof;
   a lower polarization layer between the light source and the lower substrate; and
   a lower phase difference layer between the light source and the lower substrate, and having refractive indexes satisfying the following inequation: $n_{x2} > n_{y2}$ and $n_{x2} > n_{z2}$, wherein $n_{x2}$ denotes a refractive index of the lower phase difference layer in a direction of a slow axis thereof, $n_{y2}$ denotes a refractive index of the lower phase difference layer in a direction of a fast axis thereof, $n_{z2}$ denotes a refractive index of the lower phase difference layer in a direction perpendicular to the slow axis and the fast axis thereof,
   wherein a thickness direction retardation of the upper phase difference layer satisfies the following inequation:

$$(-0.6 \times R_{th,cell} + 60) \times n_{avg} - 210 \leq R_{th1} \leq (-0.6 \times R_{th,cell} + 260) \times n_{avg} - 420,$$

wherein $R_{th1}$ denotes the thickness direction retardation of the upper phase difference layer at a wavelength of 450 nm, $R_{th,cell}$ denotes a thickness direction retardation of the liquid crystal layer at the wavelength of 450 nm, $n_{avg}$ denotes an average refractive index of the upper phase difference layer.

2. The liquid crystal display of claim 1, wherein the refractive indexes of the upper phase difference layer satisfy the following inequation: $n_{x1}=n_{y1}>n_{z1}$.

3. The liquid crystal display of claim 1, wherein the refractive indexes of the lower phase difference layer satisfy the following inequation: $n_{x2}>n_{y2}=n_{z2}$.

4. The liquid crystal display of claim 1, wherein an in-plane retardation of the lower phase difference layer satisfies the following inequation:

$$80 \text{ nm} \leq R_{in2} \leq 170 \text{ nm},$$

wherein $R_{in2}$ denotes the in-plane retardation of the lower phase difference layer at the wavelength of 450 nm.

5. The liquid crystal display of claim 1, wherein the upper phase difference layer includes a heat resistance polymer, a heat resistance liquid crystal, or a combination thereof.

6. The liquid crystal display of claim 5, wherein each of the heat resistance polymer and the heat resistance liquid crystal has a glass transition temperature of greater than or equal to about 150° C.

7. The liquid crystal display of claim 1, wherein the liquid crystal layer has a negative dielectric anisotropy.

8. The liquid crystal display of claim 1, wherein the thickness direction retardation ($R_{th,cell}$) of the liquid crystal layer satisfies the following inequation: $-360 \text{ nm} \leq R_{th,cell} \leq -250 \text{ nm}$.

9. The liquid crystal display of claim 1, wherein the average refractive index ($n_{avg}$) of the upper phase difference layer is an average value of $n_{x1}$, $n_{y1}$ and $n_{z1}$, and the average refractive index ($n_{avg}$) of the upper phase difference layer is in a range from about 1.4 to about 2.0.

10. The liquid crystal display of claim 1, further comprising:

a color conversion layer on the liquid crystal layer, wherein the color conversion layer includes a light emitting element which receives first visible light from the light source and emits second visible light.

11. The liquid crystal display of claim 10, wherein the light emitting element includes at least one of a quantum dot and a phosphor.

12. The liquid crystal display of claim 10, wherein the second visible light has a wavelength equal to greater than a wavelength of the first visible light.

13. The liquid crystal display of claim 12, wherein the first visible light is blue light, and the second visible light is the blue light, green light, red light or a combination thereof.

14. A liquid crystal display comprising:

a color conversion layer, an upper polarization layer, an upper phase difference layer, a common electrode, a liquid crystal layer, a pixel electrode, a lower phase difference layer, a lower polarization layer, and a light source, which are sequentially disposed one on another, wherein the upper phase difference layer has refractive indexes satisfying the following inequation: $n_{x1} \geq n_{y1} > n_{z1}$, wherein $n_{x1}$ denotes a refractive index of the upper phase difference layer in a direction of a slow axis thereof, $n_{y1}$ denotes a refractive index of the upper phase difference layer in a direction of a fast axis thereof, and $n_{z1}$ denotes a refractive index of the upper phase difference layer in a direction perpendicular to the slow axis and the fast axis thereof, the lower phase difference layer has refractive indexes satisfying the following inequation: $n_{x2}>n_{y2}$ and $n_{x2}>n_{z2}$, wherein $n_{x2}$ denotes a refractive index of the lower phase difference layer in a direction of a slow axis thereof, $n_{y2}$ denotes a refractive index of the lower phase difference layer in a direction of a fast axis thereof, $n_{z2}$ denotes a refractive index of the lower phase difference layer in a direction perpendicular to the slow axis and the fast axis thereof, and a thickness direction retardation of the upper phase difference layer satisfies the following inequation:

$$(-0.6 \times R_{th,cell}+60) \times n_{avg}-210 \leq R_{th1} \leq (-0.6 \times R_{th,cell}+260) \times n_{avg}-420,$$

wherein $R_{th1}$ denotes the thickness direction retardation of the upper phase difference layer at a wavelength of 450 nm, $R_{th,cell}$ denotes a thickness direction retardation of the liquid crystal layer at the wavelength of 450 nm, and $n_{avg}$ denotes an average refractive index of the upper phase difference layer.

15. The liquid crystal display of claim 14, wherein an in-plane retardation of the lower phase difference layer satisfies the following inequation:

$$80 \text{ nm} \leq R_{in2} \leq 170 \text{ nm},$$

wherein $R_{in2}$ denotes the in-plane retardation of the lower phase difference layer at the wavelength of 450 nm.

16. The liquid crystal display of claim 14, wherein the liquid crystal layer has a negative dielectric anisotropy.

17. The liquid crystal display of claim 14, wherein the thickness direction retardation ($R_{th,cell}$) of the liquid crystal layer satisfies the following inequation: $-360 \text{ nm} \leq R_{th,cell} \leq -250 \text{ nm}$.

18. The liquid crystal display of claim 14, wherein the average refractive index ($n_{avg}$) of the upper phase difference layer is an average value of $n_{x1}$, $n_{y1}$ and $n_{z1}$, and the average refractive index ($n_{avg}$) of the upper phase difference layer is in a range from about 1.4 to about 2.0.

19. The liquid crystal display of claim 14, wherein the color conversion layer includes a light emitting element which receives first visible light from the light source and emits second visible light.

20. The liquid crystal display of claim 19, wherein the first visible light is blue light, and the second visible light is the blue light, green light, red light, or a combination thereof.

* * * * *